United States Patent
Carru et al.

(10) Patent No.: US 12,001,552 B1
(45) Date of Patent: Jun. 4, 2024

(54) APPLICATION TRUST FRAMEWORK

(71) Applicant: Snowflake Inc., Bozeman, MT (US)

(72) Inventors: Damien Carru, Rhinebeck, NY (US); Pui Kei Johnston Chu, Richmond Hill (CA); Benoit Dageville, San Mateo, CA (US); Iulia Ion, Kirkland, WA (US); Unmesh Jagtap, San Mateo, CA (US); Subramanian Muralidhar, Mercer Island, WA (US); James Pan, Oakville (CA); Nihar Pasala, Mississauga (CA); Hrushikesh Shrinivas Paralikar, Hayward, CA (US); Jake Tsuyemura, San Mateo, CA (US); Ryan Charles Quistorff, Bellevue, WA (US); Rishabh Gupta, San Francisco, CA (US)

(73) Assignee: Snowflake Inc., Bozeman, MT (US)

( * ) Notice: Subject to any disclaimer, the term of this patent is extended or adjusted under 35 U.S.C. 154(b) by 0 days.

(21) Appl. No.: 18/168,852

(22) Filed: Feb. 14, 2023

(51) Int. Cl.
*G06F 21/56* (2013.01)
*G06F 8/60* (2018.01)

(52) U.S. Cl.
CPC .............. *G06F 21/565* (2013.01); *G06F 8/60* (2013.01); *G06F 2221/033* (2013.01)

(58) Field of Classification Search
CPC .... G06F 21/565; G06F 8/60; G06F 2221/033; G06F 21/56
See application file for complete search history.

(56) References Cited

U.S. PATENT DOCUMENTS

| | | | | |
|---|---|---|---|---|
| 8,302,193 | B1 * | 10/2012 | Gardner | G06F 21/57 |
| | | | | 707/769 |
| 2014/0082729 | A1 * | 3/2014 | Shim | G06F 21/577 |
| | | | | 726/23 |
| 2015/0163232 | A1 * | 6/2015 | Liao | G06F 21/563 |
| | | | | 726/23 |
| 2017/0351862 | A1 * | 12/2017 | Mohinder | G06F 21/57 |
| 2018/0139216 | A1 * | 5/2018 | Rasanen | H04L 63/1416 |
| 2021/0319108 | A1 * | 10/2021 | Segal | G06F 21/53 |
| 2023/0177156 | A1 * | 6/2023 | Jung | G06F 11/36 |
| | | | | 726/23 |

FOREIGN PATENT DOCUMENTS

CN          106453429 A  *  2/2017  ............. G06F 17/50

* cited by examiner

*Primary Examiner* — Jayesh M Jhaveri
(74) *Attorney, Agent, or Firm* — Schwegman Lundberg & Woessner, P.A.

(57) ABSTRACT

An anti-abuse system is provided for a data-platform. An anti-abuse scanner of the data-platform detects a creation of an application package by a provider of content to the data platform where the application package includes a set of files for deployment on the data platform. The anti-abuse scanner performs a review of the set of files to detect malicious content where the review is based on a set of analysis rules and generates a deployment decision for the application package based on a result of the review.

30 Claims, 9 Drawing Sheets

APPLICATION TRUST FRAMEWORK

TECHNICAL FIELD

Examples of the disclosure relate generally to databases and, more specifically, to security of applications executing on a data platform.

BACKGROUND

Data platforms are widely used for data storage and data access in computing and communication contexts. With respect to architecture, a data platform could be an on-premises data platform, a network-based data platform (e.g., a cloud-based data platform), a combination of the two, and/or include another type of architecture. With respect to type of data processing, a data platform could implement online transactional processing (OLTP), online analytical processing (OLAP), a combination of the two, and/or another type of data processing. Moreover, a data platform could be or include a relational database management system (RDBMS) and/or one or more other types of database management systems. Users may develop applications that execute on data platforms. It is desirable to safeguard the security of the data platform during application deployment.

BRIEF DESCRIPTION OF THE DRAWINGS

The present disclosure will be understood more fully from the detailed description given below and from the accompanying drawings of various examples of the disclosure.

DETAILED DESCRIPTION

Figure 1:
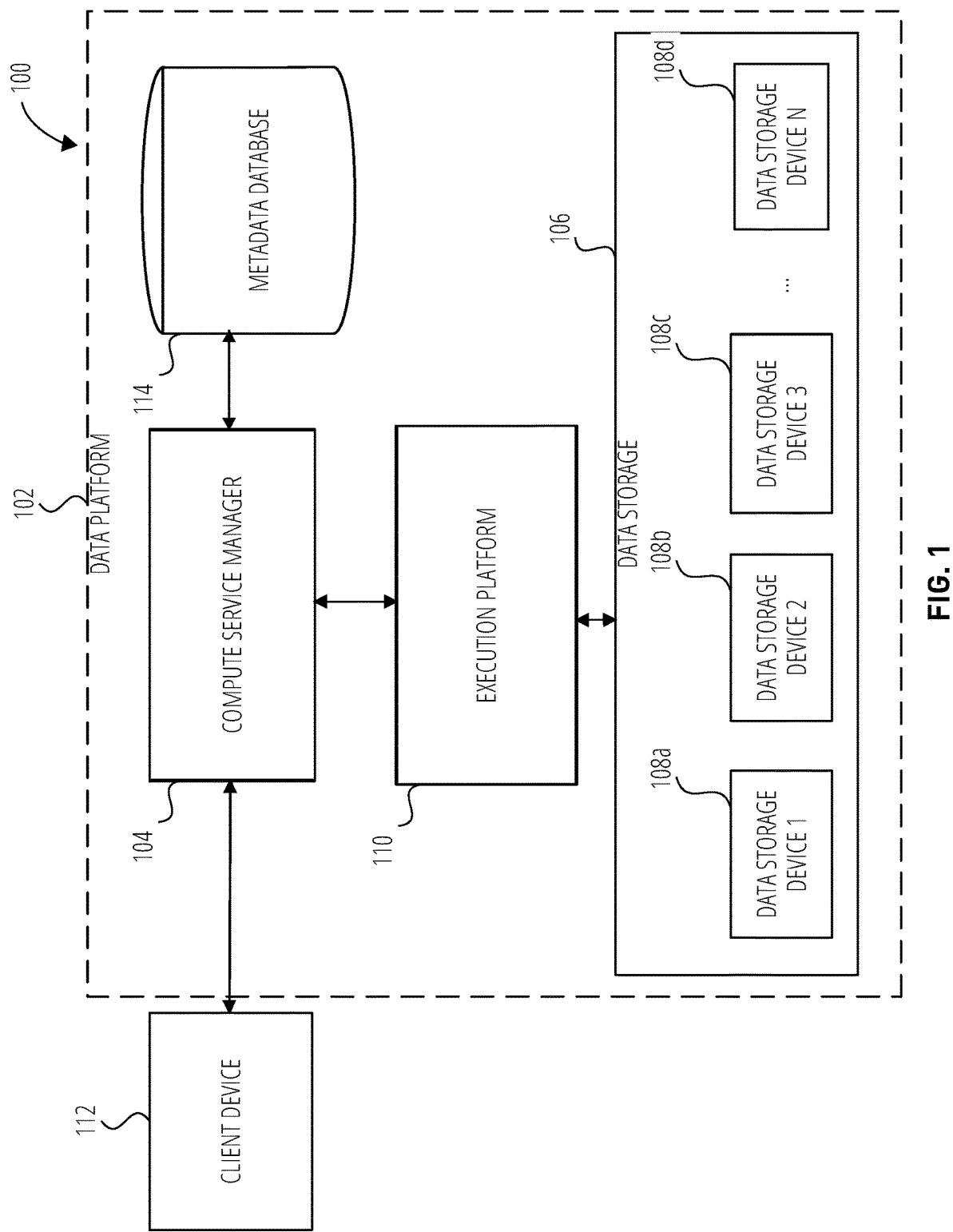
FIG. 1 illustrates an example computing environment that includes a network-based data platform in communication with a cloud storage provider system, in accordance with some examples.

An operator of a data platform may provide an application framework for users of a platform to develop their own applications that run on the data platform. Furthermore, some users may want to be content providers that provide applications and content to other users on the data platform who are consumers of the content. This enables providers to build, monetize and deploy data-intensive applications in a data platform marketplace. Such as marketplace allows consumers to discover and install applications natively within their data platform accounts. Although the application framework provides data platform providers with a platform to build their data-intensive applications, it also introduces an inherent risk of malicious actors exploiting this framework to build malicious applications that pose multiple abuse threats, including, but not limited to, data exfiltration, account compromise, intellectual property theft, and misuse of consumer's compute/storage. Even well-intended application providers can inadvertently create insecure applications that can be exploited by malicious consumers or attackers to exfiltrate provider IP and abuse the data platform and its customers. If these kinds of scenarios were to happen, it would lead to a poor experience for data platform customers with a loss of reputation for the operator of the data platform.

In some examples, an anti-abuse scanner of the data-platform detects a creation of an application package by a provider of content to the data platform where the application package includes a set of files for deployment on the data platform. The anti-abuse scanner performs a review the set of files to detect malicious content where the review based on a set of analysis rules and generates a deployment decision for the application package based on a result of the review.

In some examples, the anti-abuse scanner detects a creation of a listing of the application package where the listing targets a consumer of data services on the data platform.

In some examples, the anti-abuse scanner scans the set of files using a set of a scanner tools where the set of scanner tools generate a respective verdict of a set of verdicts of whether the set of files contain malicious content.

In some examples, the anti-abuse scanner uses a previous result of a previous review to make a deployment decision along with the set of verdicts.

In some examples, the anti-abuse scanner makes deployment decisions that may be an automatic approval of deployment, an automatic rejection of deployment, or triggering of a manual review of the files.

Reference will now be made in detail to specific examples for carrying out the inventive subject matter. Examples of these specific examples are illustrated in the accompanying drawings, and specific details are set forth in the following description in order to provide a thorough understanding of the subject matter. It will be understood that these examples are not intended to limit the scope of the claims to the illustrated examples. On the contrary, they are intended to cover such alternatives, modifications, and equivalents as may be included within the scope of the disclosure.

FIG. 1 illustrates an example computing environment 100 that includes a data platform 102 in communication with a client device 112, in accordance with some examples. To avoid obscuring the inventive subject matter with unnecessary detail, various functional components that are not germane to conveying an understanding of the inventive subject matter have been omitted from FIG. 1. However, a skilled artisan will readily recognize that various additional functional components may be included as part of the computing environment 100 to facilitate additional functionality that is not specifically described herein.

As shown, the data platform 102 comprises a data storage 106, a compute service manager 104, an execution platform 110, and a metadata database 114. The data storage 106 comprises a plurality of computing machines and provides on-demand computer system resources such as data storage and computing power to the data platform 102. As shown, the data storage 106 comprises multiple data storage devices, such as data storage device 1 108a, data storage device 2 108*b*, data storage device 3 108*c*, and data storage device N 108*d*. In some examples, the data storage devices 1 to N are cloud-based storage devices located in one or more geographic locations. For example, the data storage devices 1 to N may be part of a public cloud infrastructure or a private cloud infrastructure. The data storage devices 1 to N may be hard disk drives (HDDs), solid state drives (SSDs), storage clusters, Amazon S3TM storage systems or any other data storage technology. Additionally, the data storage 106 may include distributed file systems (e.g., Hadoop Distributed File Systems (HDFS)), object storage systems, and the like.

The data platform 102 is used for reporting and analysis of integrated data from one or more disparate sources including the storage devices 1 to N within the data storage 106. The data platform 102 hosts and provides data reporting and analysis services to multiple consumer accounts. Administrative users can create and manage identities (e.g., users, roles, and groups) and use privileges to allow or deny access to identities to resources and services. Generally, the data platform 102 maintains numerous consumer accounts for numerous respective consumers. The data platform 102 maintains each consumer account in one or more storage devices of the data storage 106. Moreover, the data platform 102 may maintain metadata associated with the consumer accounts in the metadata database 114. Each consumer account includes multiple objects with examples including users, roles, privileges, a datastores or other data locations (herein termed a "stage" or "stages"), and the like.

The compute service manager 104 coordinates and manages operations of the data platform 102. The compute service manager 104 also performs query optimization and compilation as well as managing clusters of compute services that provide compute resources (also referred to as "virtual warehouses"). The compute service manager 104 can support any number and type of clients such as end users providing data storage and retrieval requests, system administrators managing the systems and methods described herein, and other components/devices that interact with compute service manager 104. As an example, the compute service manager 104 is in communication with the client device 112. The client device 112 can be used by a user of one of the multiple consumer accounts supported by the data platform 102 to interact with and utilize the functionality of the data platform 102. In some examples, the compute service manager 104 does not receive any direct communications from the client device 112 and only receives communications concerning jobs from a queue within the data platform 102.

The compute service manager 104 is also coupled to metadata database 114. The metadata database 114 stores data pertaining to various functions and examples associated with the data platform 102 and its users. In some examples, the metadata database 114 includes a summary of data stored in remote data storage systems as well as data available from a local cache. In some examples, the metadata database 114 may include information regarding how data is organized in remote data storage systems (e.g., the database storage 106) and the local caches. In some examples, the metadata database 114 include data of metrics describing usage and access by providers and consumers of the data stored on the data platform 102. In some examples, the metadata database 114 allows systems and services to determine whether a piece of data needs to be accessed without loading or accessing the actual data from a storage device.

The compute service manager 104 is further coupled to the execution platform 110, which provides multiple computing resources that execute various data storage and data retrieval tasks. The execution platform 110 is coupled to the database storage 106. The execution platform 110 comprises a plurality of compute nodes. A set of processes on a compute node executes a query plan compiled by the compute service manager 104. The set of processes can include: a first process to execute the query plan; a second process to monitor and delete micro-partition files using a least recently used (LRU) policy and implement an out of memory (OOM) error mitigation process; a third process that extracts health information from process logs and status to send back to the compute service manager 104; a fourth process to establish communication with the compute service manager 104 after a system boot; and a fifth process to handle all communication with a compute cluster for a given job provided by the compute service manager 104 and to communicate information back to the compute service manager 104 and other compute nodes of the execution platform 110.

In some examples, communication links between elements of the computing environment 100 are implemented via one or more data communication networks. These data communication networks may utilize any communication protocol and any type of communication medium. In some examples, the data communication networks are a combination of two or more data communication networks (or sub-networks) coupled to one another. In alternate examples, these communication links are implemented using any type of communication medium and any communication protocol.

As shown in FIG. 1, the data storage devices data storage device 1 108*a* to data storage device N 108*d* are decoupled from the computing resources associated with the execution platform 110. This architecture supports dynamic changes to the data platform 102 based on the changing data storage/retrieval needs as well as the changing needs of the users and systems. The support of dynamic changes allows the data platform 102 to scale quickly in response to changing demands on the systems and components within the data platform 102. The decoupling of the computing resources from the data storage devices supports the storage of large amounts of data without requiring a corresponding large amount of computing resources. Similarly, this decoupling of resources supports a significant increase in the computing resources utilized at a particular time without requiring a corresponding increase in the available data storage resources.

The compute service manager 104, metadata database 114, execution platform 110, and data storage 106 are shown in FIG. 1 as individual discrete components. However, each of the compute service manager 104, metadata database 114, execution platform 110, and data storage 106 may be implemented as a distributed system (e.g., distributed across multiple systems/platforms at multiple geographic locations). Additionally, each of the compute service manager 104, metadata database 114, execution platform 110, and data storage 106 can be scaled up or down (independently of one another) depending on changes to the requests received and the changing needs of the data platform 102. Thus, in the described examples, the data platform 102 is dynamic and supports regular changes to meet the current data processing needs.

During operation, the data platform 102 processes multiple jobs determined by the compute service manager 104. These jobs are scheduled and managed by the compute service manager 104 to determine when and how to execute the job. For example, the compute service manager 104 may divide the job into multiple discrete tasks and may determine what data is needed to execute each of the multiple discrete tasks. The compute service manager 104 may assign each of the multiple discrete tasks to one or more nodes of the execution platform 110 to process the task. The compute service manager 104 may determine what data is needed to process a task and further determine which nodes within the execution platform 110 are best suited to process the task. Some nodes may have already cached the data needed to process the task and, therefore, be a good candidate for processing the task. Metadata stored in the metadata database 114 assists the compute service manager 104 in determining which nodes in the execution platform 110 have already cached at least a portion of the data needed to process the task. One or more nodes in the execution platform 110 process the task using data cached by the nodes and, if necessary, data retrieved from the data storage 106. It is desirable to retrieve as much data as possible from caches within the execution platform 110 because the retrieval speed is typically faster than retrieving data from the data storage 106.

As shown in FIG. 1, the computing environment 100 separates the execution platform 110 from the data storage 106. In this arrangement, the processing resources and cache resources in the execution platform 110 operate independently of the database storage devices data storage device 1 108a to data storage device N 108d in the data storage 106. Thus, the computing resources and cache resources are not restricted to a specific one of the data storage device 1 108a to data storage device N 108d. Instead, all computing resources and all cache resources may retrieve data from, and store data to, any of the data storage resources in the data storage 106.

Figure 2:
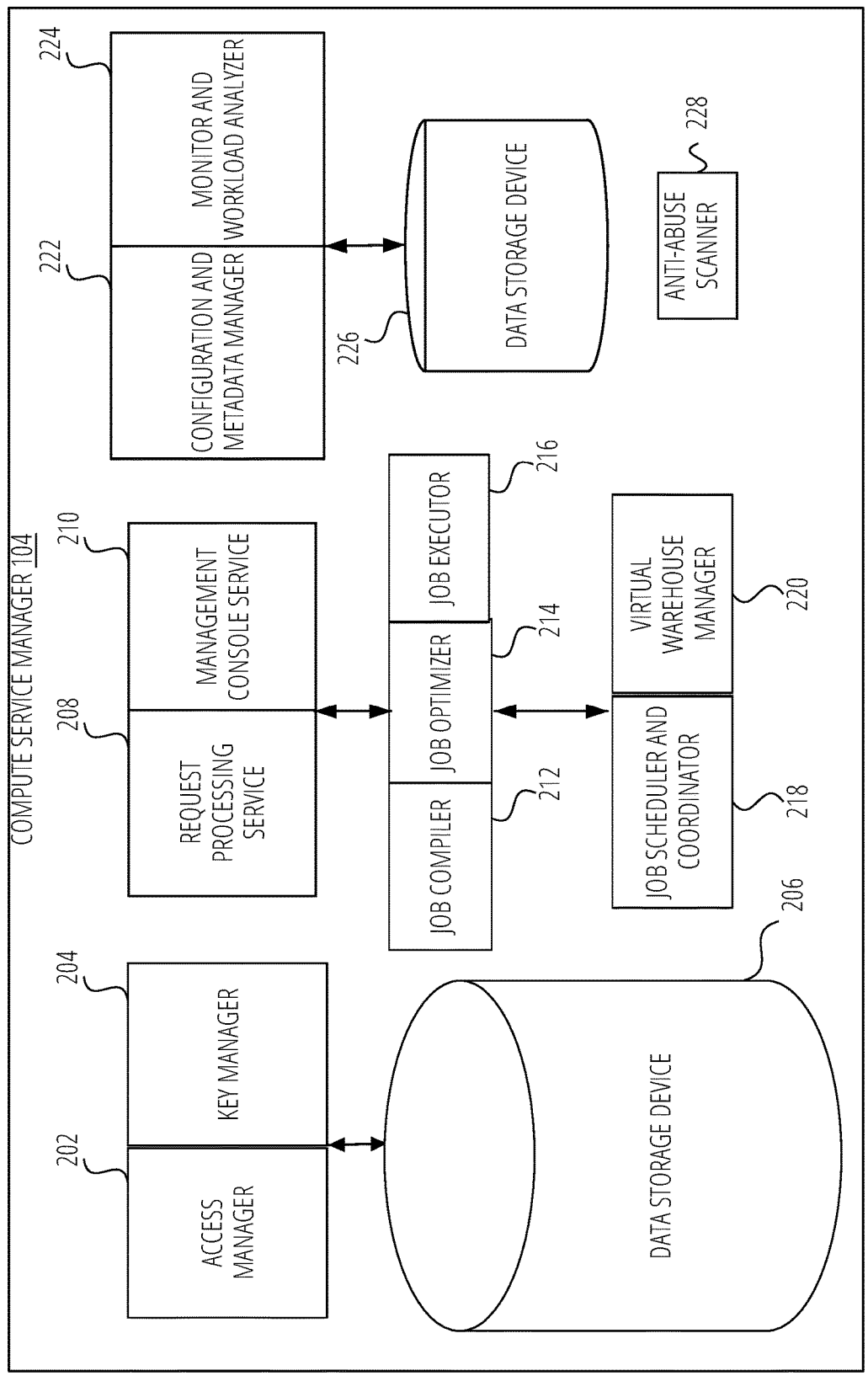
FIG. 2 is a block diagram illustrating components of a compute service manager, in accordance with some examples.

FIG. 2 is a block diagram illustrating components of the compute service manager 104, in accordance with some examples. As shown in FIG. 2, the compute service manager 104 includes an access manager 202, and a key manager 204. Access manager 202 handles authentication and authorization tasks for the systems described herein. Key manager 204 manages storage and authentication of keys used during authentication and authorization tasks. For example, access manager 202 and key manager 204 manage the keys used to access data stored in remote storage devices (e.g., data storage devices in data storage data storage device 206). As used herein, the remote storage devices may also be referred to as "persistent storage devices" or "shared storage devices."

A request processing service 208 manages received data storage requests and data retrieval requests (e.g., jobs to be performed on database data). For example, the request processing service 208 may determine the data necessary to process a received query (e.g., a data storage request or data retrieval request). The data may be stored in a cache within the execution platform 110 or in a data storage device in data storage 106.

A management console service 210 supports access to various systems and processes by administrators and other system managers. Additionally, the management console service 210 may receive a request to execute a job and monitor the workload on the system.

The compute service manager 104 also includes a job compiler 212, a job optimizer 214, and a job executor 216. The job compiler 212 parses a job into multiple discrete tasks and generates the execution code for each of the multiple discrete tasks. The job optimizer 214 determines the best method to execute the multiple discrete tasks based on the data that needs to be processed. The job optimizer 214 also handles various data pruning operations and other data optimization techniques to improve the speed and efficiency of executing the job. The job executor 216 executes the execution code for jobs received from a queue or determined by the compute service manager 104.

A job scheduler and coordinator 218 sends received jobs to the appropriate services or systems for compilation, optimization, and dispatch to the execution platform 110. For example, jobs may be prioritized and processed in that prioritized order. In some examples, the job scheduler and coordinator 218 determines a priority for internal jobs that are scheduled by the compute service manager 104 with other "outside" jobs such as user queries that may be scheduled by other systems in the database but may utilize the same processing resources in the execution platform 110. In some examples, the job scheduler and coordinator 218 identifies or assigns particular nodes in the execution platform 110 to process particular tasks. A virtual warehouse manager 220 manages the operation of multiple virtual warehouses implemented in the execution platform 110. As discussed below, each virtual warehouse includes multiple execution nodes that each include a cache and a processor.

Additionally, the compute service manager 104 includes a configuration and metadata manager 222, which manages the information related to the data stored in the remote data storage devices and in the local caches (e.g., the caches in execution platform 110). The configuration and metadata manager 222 uses the metadata to determine which data micro-partitions need to be accessed to retrieve data for processing a particular task or job. A monitor and workload analyzer 224 oversees processes performed by the compute service manager 104 and manages the distribution of tasks (e.g., workload) across the virtual warehouses and execution nodes in the execution platform 110. The monitor and workload analyzer 224 also redistributes tasks, as needed, based on changing workloads throughout the data platform 102 and may further redistribute tasks based on a user (e.g., "external") query workload that may also be processed by the execution platform 110. The configuration and metadata manager 222 and the monitor and workload analyzer 224 are coupled to a data storage device 226. Data storage device 226 in FIG. 2 represents any data storage device within the data platform 102. For example, data storage device 226 may represent caches in execution platform 110, storage devices in data storage 106, or any other storage device.

The compute service manager 104 validates all communication from an execution platform (e.g., the execution platform 110) to validate that the content and context of that communication are consistent with the task(s) known to be assigned to the execution platform. For example, an instance of the execution platform executing a query A should not be allowed to request access to data-source D (e.g., data storage device 226) that is not relevant to query A. Similarly, a given execution node (e.g., execution node 1 304a) may need to communicate with another execution node (e.g., execution node 2 304b), and should be disallowed from communicating with a third execution node (e.g., execution node 1 316a) and any such illicit communication can be recorded (e.g., in a log or other location). Also, the information stored on a given execution node is restricted to data relevant to the current query and any other data is unusable, rendered so by destruction or encryption where the key is unavailable.

The compute service manager 104 further comprises an anti-abuse scanner 228 that monitors creation of application packages created by content providers of the data platform 102. When a new application package is created by a content provider, the anti-abuse scanner 228 scans the application package to determine if the application package contains content that is harmful. malicious, and the like. If such content is found, the anti-abuse scanner 228 prevents release of the application package by the content provider.

In some examples, the anti-abuse scanner 228 is a component of another system that the compute service manager 104 communicates with via a network of the like.

Figure 3:
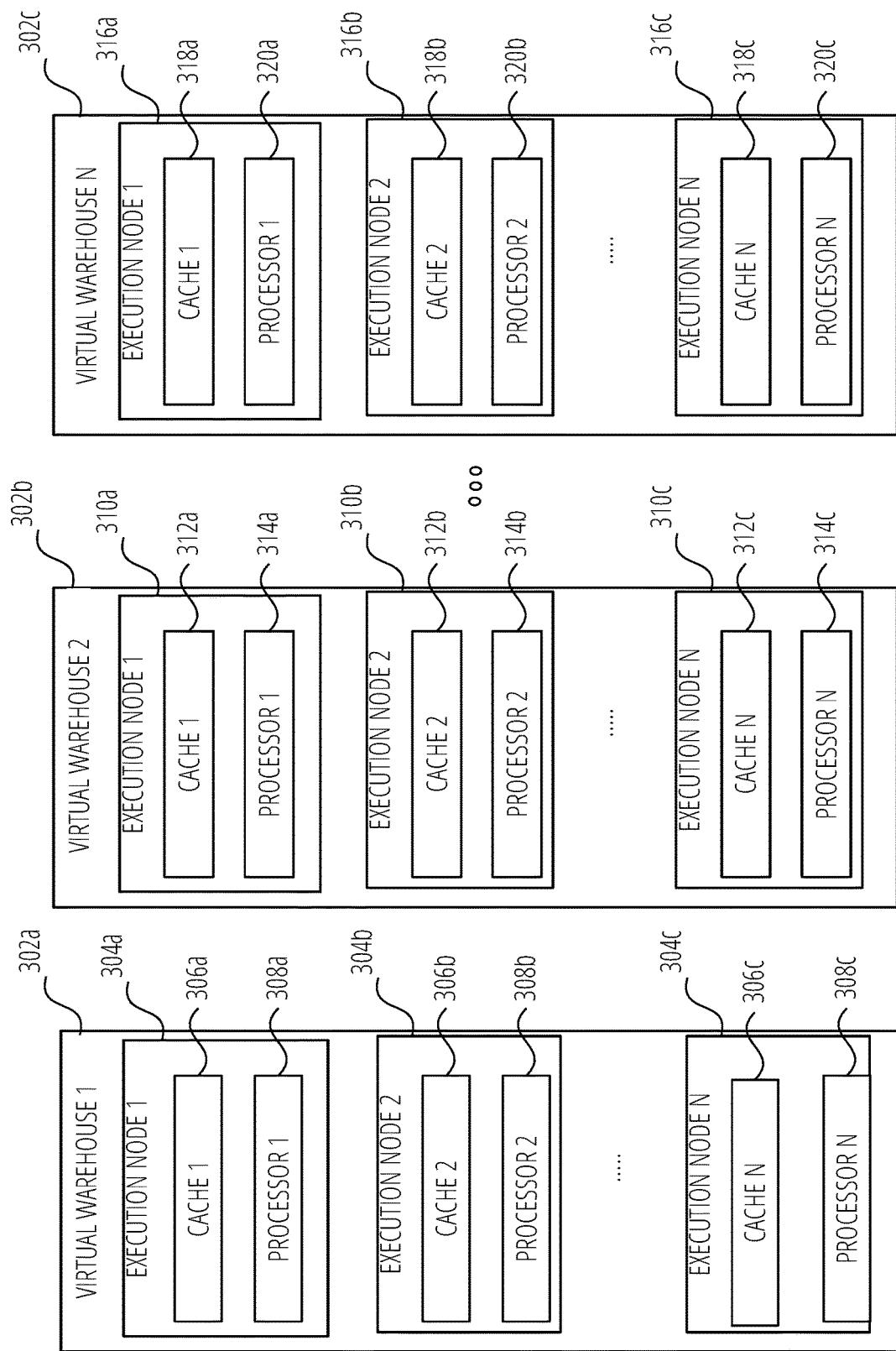
FIG. 3 is a block diagram illustrating components of an execution platform, in accordance with some examples.

FIG. 3 is a block diagram illustrating components of the execution platform 110, in accordance with some examples. As shown in FIG. 3, the execution platform 110 includes multiple virtual warehouses, including virtual warehouse 1 302a, and virtual warehouse 2 302b to virtual warehouse N 302c. Each virtual warehouse includes multiple execution nodes that each includes a data cache and a processor. The virtual warehouses can execute multiple tasks in parallel by using the multiple execution nodes. As discussed herein, the execution platform 110 can add new virtual warehouses and drop existing virtual warehouses in real time based on the current processing needs of the systems and users. This flexibility allows the execution platform 110 to quickly deploy large amounts of computing resources when needed without being forced to continue paying for those computing resources when they are no longer needed. All virtual warehouses can access data from any data storage device (e.g., any storage device in data storage 106).

Although each virtual warehouse shown in FIG. 3 includes three execution nodes, a particular virtual warehouse may include any number of execution nodes. Further, the number of execution nodes in a virtual warehouse is dynamic, such that new execution nodes are created when additional demand is present, and existing execution nodes are deleted when they are no longer necessary.

Each virtual warehouse is capable of accessing any of the data storage devices 1 to N shown in FIG. 1. Thus, the virtual warehouses are not necessarily assigned to a specific data storage device 1 to N and, instead, can access data from any of the data storage devices 1 to N within the data storage 106. Similarly, each of the execution nodes shown in FIG. 3 can access data from any of the data storage devices 1 to N. In some examples, a particular virtual warehouse or a particular execution node may be temporarily assigned to a specific data storage device, but the virtual warehouse or execution node may later access data from any other data storage device.

In the example of FIG. 3, virtual warehouse 1 302a includes a plurality of execution nodes as exemplified by execution node 1 304a, execution node 2 304b, and execution node N 304c. Execution node 1 304a includes cache 1 306a and a processor 1 308a. Execution node 2 304b includes cache 2 306b and processor 2 308b. Execution node N 304c includes cache N 306c and processor N 308c. Each execution node 1 to N is associated with processing one or more data storage and/or data retrieval tasks. For example, a virtual warehouse may handle data storage and data retrieval tasks associated with an internal service, such as a clustering service, a materialized view refresh service, a file compaction service, a storage procedure service, or a file upgrade service. In other implementations, a particular virtual warehouse may handle data storage and data retrieval tasks associated with a particular data storage system or a particular category of data.

Similar to virtual warehouse 1 302a discussed above, virtual warehouse 2 302b includes a plurality of execution nodes as exemplified by execution node 1 310a, execution node 2 310b, and execution node N 310c. Execution node 1 304a includes cache 1 312a and processor 1 314a. Execution node 2 310b includes cache 2 312b and processor 2 314b.

Execution node N 310c includes cache N 312c and processor N 314c. Additionally, virtual warehouse N 302c includes a plurality of execution nodes as exemplified by execution node 1 316a, execution node 2 316b, and execution node N 316c. Execution node 1 316a includes cache 1 318a and processor 1 320a. Execution node 2 316b includes cache 2 318b and processor 2 320b. Execution node N 316c includes cache N 318c and processor N 320c.

In some examples, the execution nodes shown in FIG. 3 are stateless with respect to the data the execution nodes are caching. For example, these execution nodes do not store or otherwise maintain state information about the execution node or the data being cached by a particular execution node. Thus, in the event of an execution node failure, the failed node can be transparently replaced by another node. Since there is no state information associated with the failed execution node, the new (replacement) execution node can easily replace the failed node without concern for recreating a particular state.

Although the execution nodes shown in FIG. 3 each includes one data cache and one processor, alternate examples may include execution nodes containing any number of processors and any number of caches. Additionally, the caches may vary in size among the different execution nodes. The caches shown in FIG. 3 store, in the local execution node, data that was retrieved from one or more data storage devices in data storage 106. Thus, the caches reduce or eliminate the bottleneck problems occurring in platforms that consistently retrieve data from remote storage systems. Instead of repeatedly accessing data from the remote storage devices, the systems and methods described herein access data from the caches in the execution nodes, which is significantly faster and avoids the bottleneck problem discussed above. In some examples, the caches are implemented using high-speed memory devices that provide fast access to the cached data. Each cache can store data from any of the storage devices in the data storage 106.

Further, the cache resources and computing resources may vary between different execution nodes. For example, one execution node may contain significant computing resources and minimal cache resources, making the execution node useful for tasks that require significant computing resources. Another execution node may contain significant cache resources and minimal computing resources, making this execution node useful for tasks that require caching of large amounts of data. Yet another execution node may contain cache resources providing faster input-output operations, useful for tasks that require fast scanning of large amounts of data. In some examples, the cache resources and computing resources associated with a particular execution node are determined when the execution node is created, based on the expected tasks to be performed by the execution node.

Additionally, the cache resources and computing resources associated with a particular execution node may change over time based on changing tasks performed by the execution node. For example, an execution node may be assigned more processing resources if the tasks performed by the execution node become more processor-intensive. Similarly, an execution node may be assigned more cache resources if the tasks performed by the execution node require a larger cache capacity.

Although virtual warehouses 1, 2, and N are associated with the same execution platform 110, the virtual warehouses may be implemented using multiple computing systems at multiple geographic locations. For example, virtual warehouse 1 can be implemented by a computing system at a first geographic location, while virtual warehouses 2 and N are implemented by another computing system at a second geographic location. In some examples, these different computing systems are cloud-based computing systems maintained by one or more different entities.

Additionally, each virtual warehouse as shown in FIG. 3 has multiple execution nodes. The multiple execution nodes associated with each virtual warehouse may be implemented using multiple computing systems at multiple geographic locations. For example, an instance of virtual warehouse 1 302a implements execution node 1 304a and execution node 2 304b on one computing platform at a geographic location and implements execution node N 304c at a different computing platform at another geographic location. Selecting particular computing systems to implement an execution node may depend on various factors, such as the level of resources needed for a particular execution node (e.g., processing resource requirements and cache requirements), the resources available at particular computing systems, communication capabilities of networks within a geographic location or between geographic locations, and which computing systems are already implementing other execution nodes in the virtual warehouse.

A particular execution platform 110 may include any number of virtual warehouses. Additionally, the number of virtual warehouses in a particular execution platform is dynamic, such that new virtual warehouses are created when additional processing and/or caching resources are needed. Similarly, existing virtual warehouses may be deleted when the resources associated with the virtual warehouse are no longer necessary.

In some examples, the virtual warehouses may operate on the same data in data storage 106, but each virtual warehouse has its own execution nodes with independent processing and caching resources. This configuration allows requests on different virtual warehouses to be processed independently and with no interference between the requests. This independent processing, combined with the ability to dynamically add and remove virtual warehouses, supports the addition of new processing capacity for new users without impacting the performance observed by the existing users.

Figure 4A:
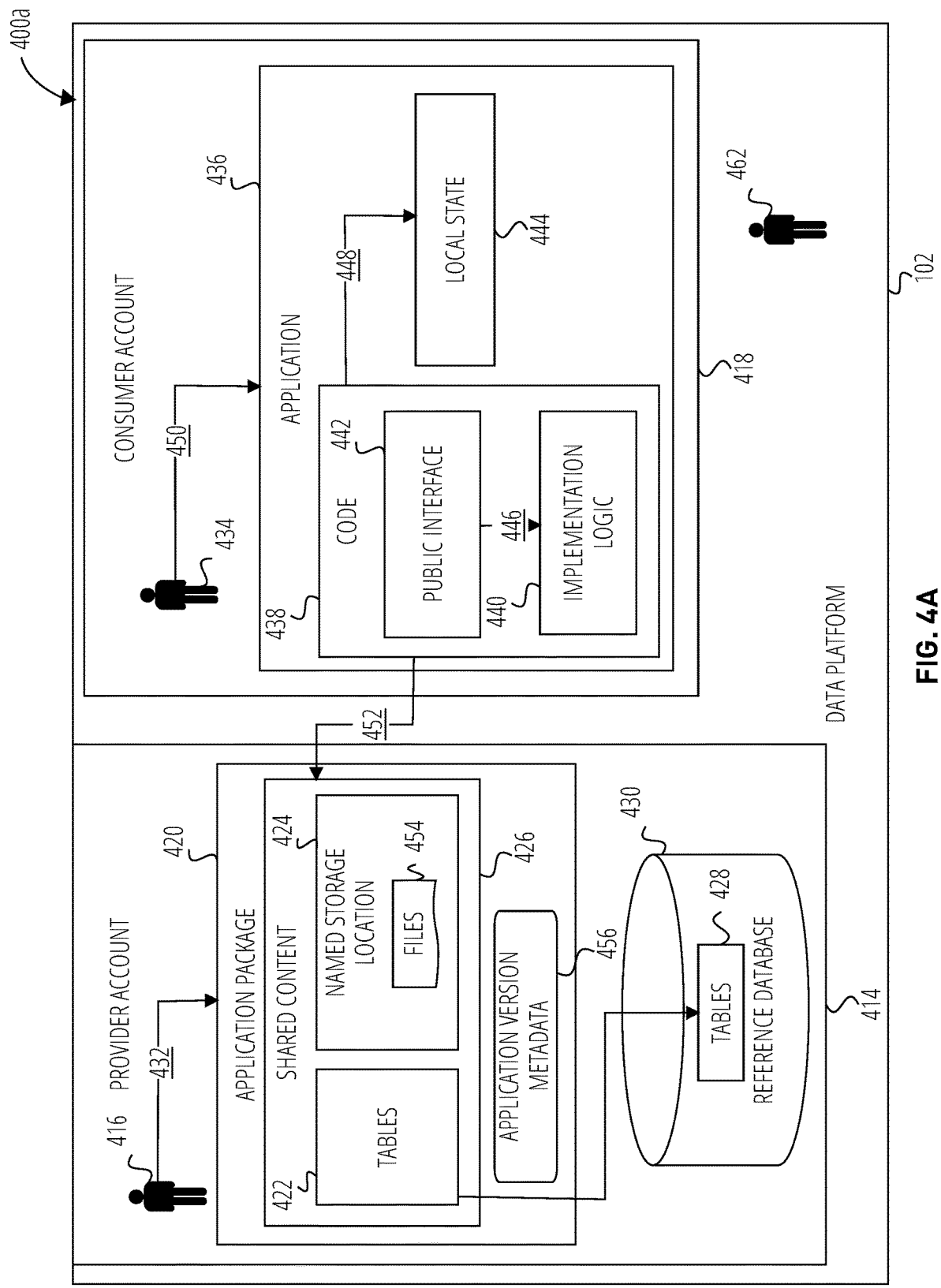
FIG. 4A is a block diagram of an application package deployment, in accordance with some examples.
Figure 4B:
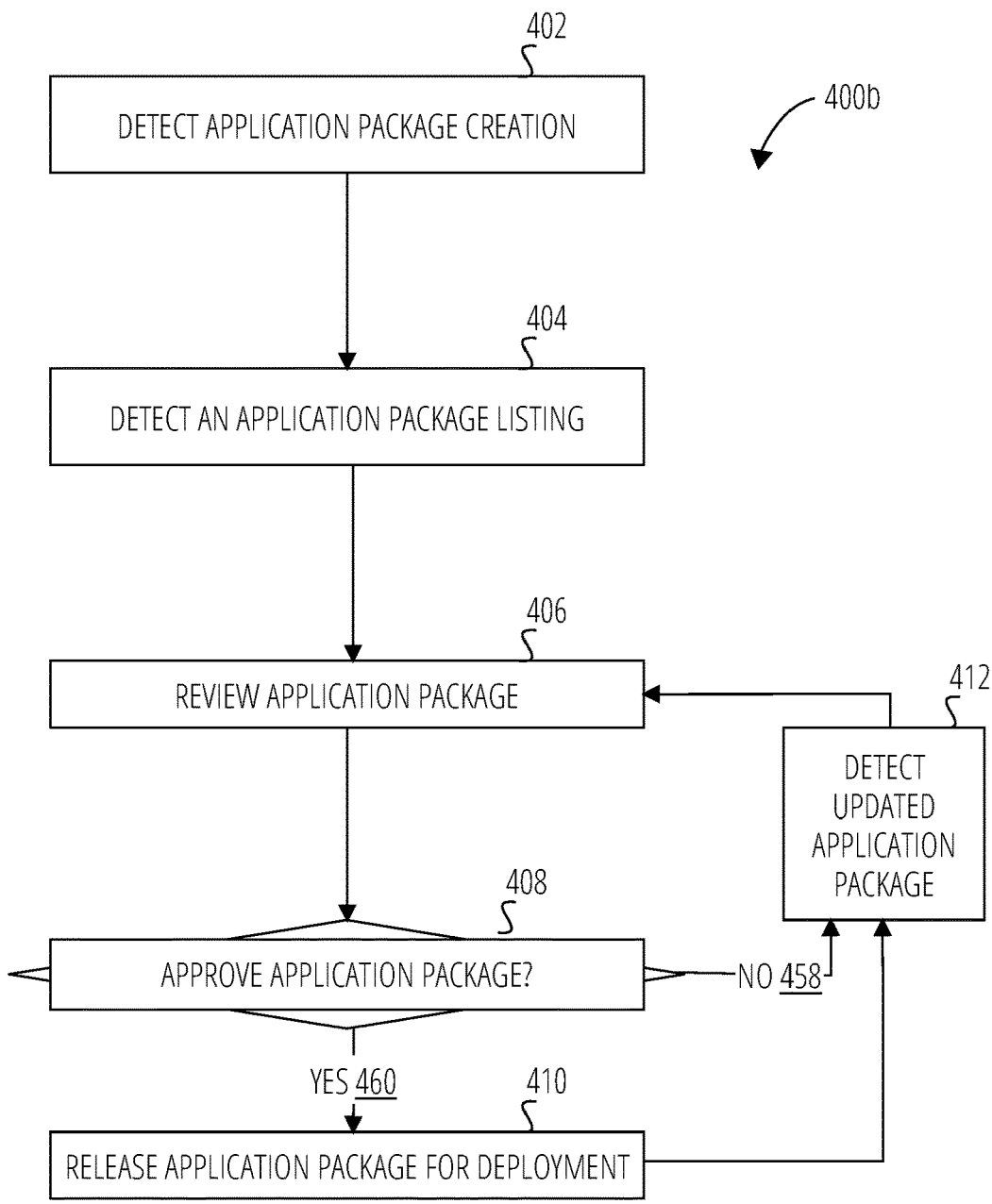
FIG. 4B is an activity diagram of an anti-abuse security scan workflow, in accordance with some examples.

FIG. 4A is a block diagram of an application package deployment 400a and FIG. 4B is an activity diagram of an anti-abuse security scan workflow 400b, in accordance with some examples. A provider 416 creates 432 an application package 420 for deployment as an application 436 to a consumer 434 on a data platform 102. Neither the provider 416 nor the consumer 434 are the operator 462 of the data platform 102. The operator 462 has a responsibility to ensure the integrity of the data platform 102 by preventing the provider 416 from deploying on to the data platform 102 content that is harmful or malicious using the application package 420. Accordingly, the operator 462 uses an anti-abuse scanner 228 (of FIG. 2) to scan the files 454 to determine whether the application package 420 contains malicious content.

The application 436 provides a useful service to the consumer 434, such as allowing the consumer 434 to access shared content 426 provided by the provider 416. The shared content is stored in a named storage location 424 maintained by the data platform 102. The shared content 426 comprises tables 422 that are extracted from tables 428 in a reference database 430 maintained by the provider 416 in a provider account 414 of the provider 416. Code 438 of the deployed application 436 uses 452 the shared content 426 from a consumer account 418 when the consumer 434 accesses 450 the deployed application 436. Code 438 comprises a public interface 442 that uses 446 implementation logic 440 to provide a user interface to the consumer 434. The application 436 further comprises a local state 444 that the code uses and updates 448. The local state comprises the state of the deployed application 436 such as a configuration and local data storage of the deployed application 436 within the security context of the consumer account 418.

The application package includes an application version metadata 456 that is not visible to the provider 416. The application version metadata 456 comprises metadata of the application package 420 that the data platform 102 accesses during an anti-abuse scanning process as more fully described in reference to FIG. 5A, FIG. 5B, and FIG. 5C.

In operation 402, the data platform 102 detects that the provider 416 is creating the application package 420. In response to detecting the creation of the application package 420, the data platform 102 generates application version metadata 456 comprising a hidden version validation attribute or property with a value set to a disabled state and sets a creation property to a new state. This prevents the release of the application package 420 by the provider 416 into an application marketplace of the data platform 102. In some examples, the data platform 102 detects that the provider creates versions of the application package 420. In response, the data platform 102 does not trigger an automated anti-abuse scan but adds metadata to the application version metadata 456 describing the version of the package, sets a scan property status to a new state indicating no anti-abuse reviews or scans have been performed on the application package 420.

In operation 404, the data platform 102 detects that the provider 416 creates a marketplace or public listing for the application package 420. In some examples, the data platform 102 detects that the provider 416 alters a private listing to add external targets and the application package will not be listed in the public marketplace. In response to detecting a listing, the data platform 102 sets a property of the listing to a drafted and unpublished state, so changes are not effective until the listing is reviewed, approved and published by the data platform 102. In some examples, the data platform 102 updates the application version metadata 456 to set the version validation property to an enabled state.

Figure 5A:
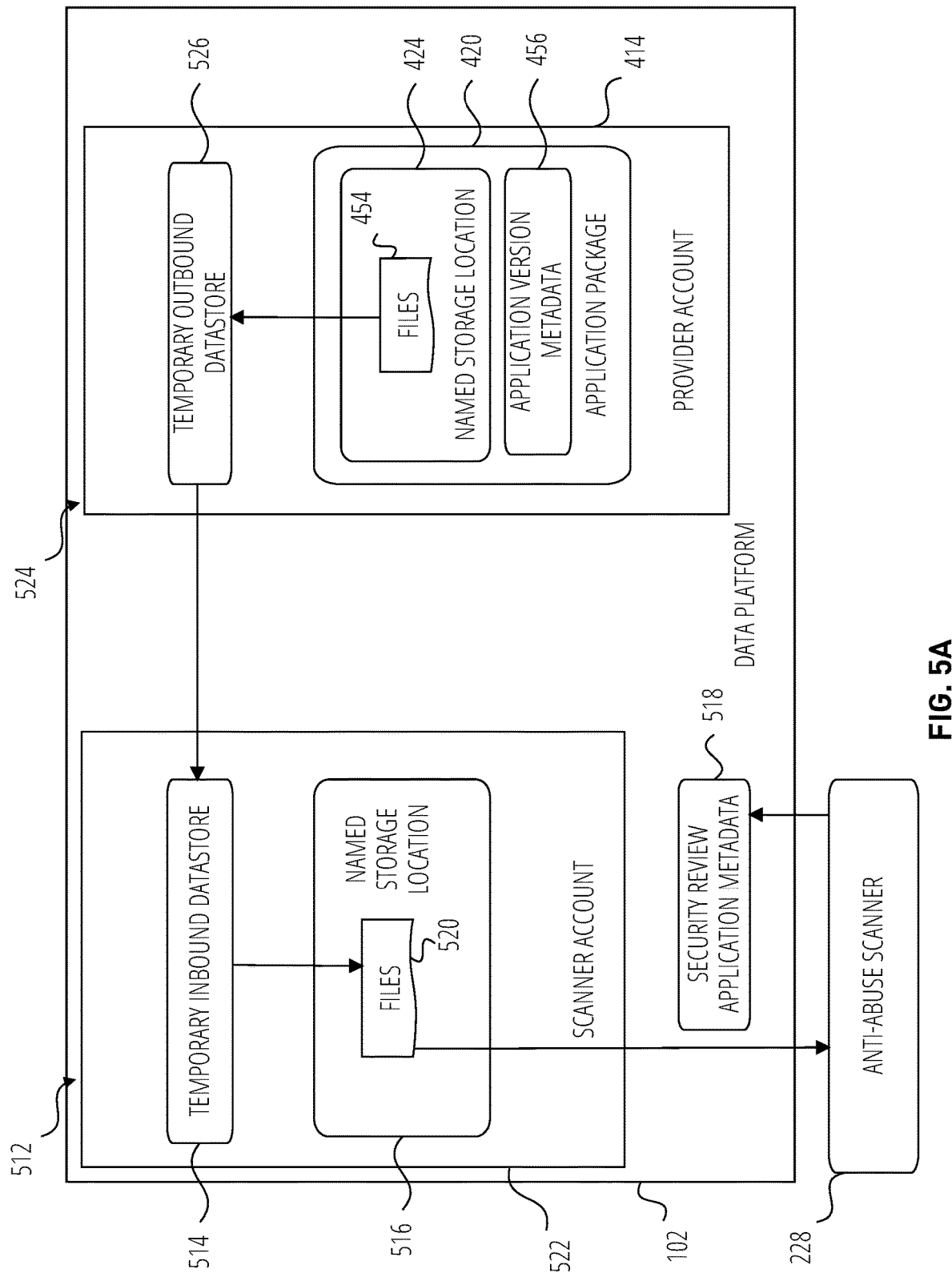
FIG. 5A is a data flow diagram of an anti-abuse scanning method, in accordance with some examples.
Figure 5B:
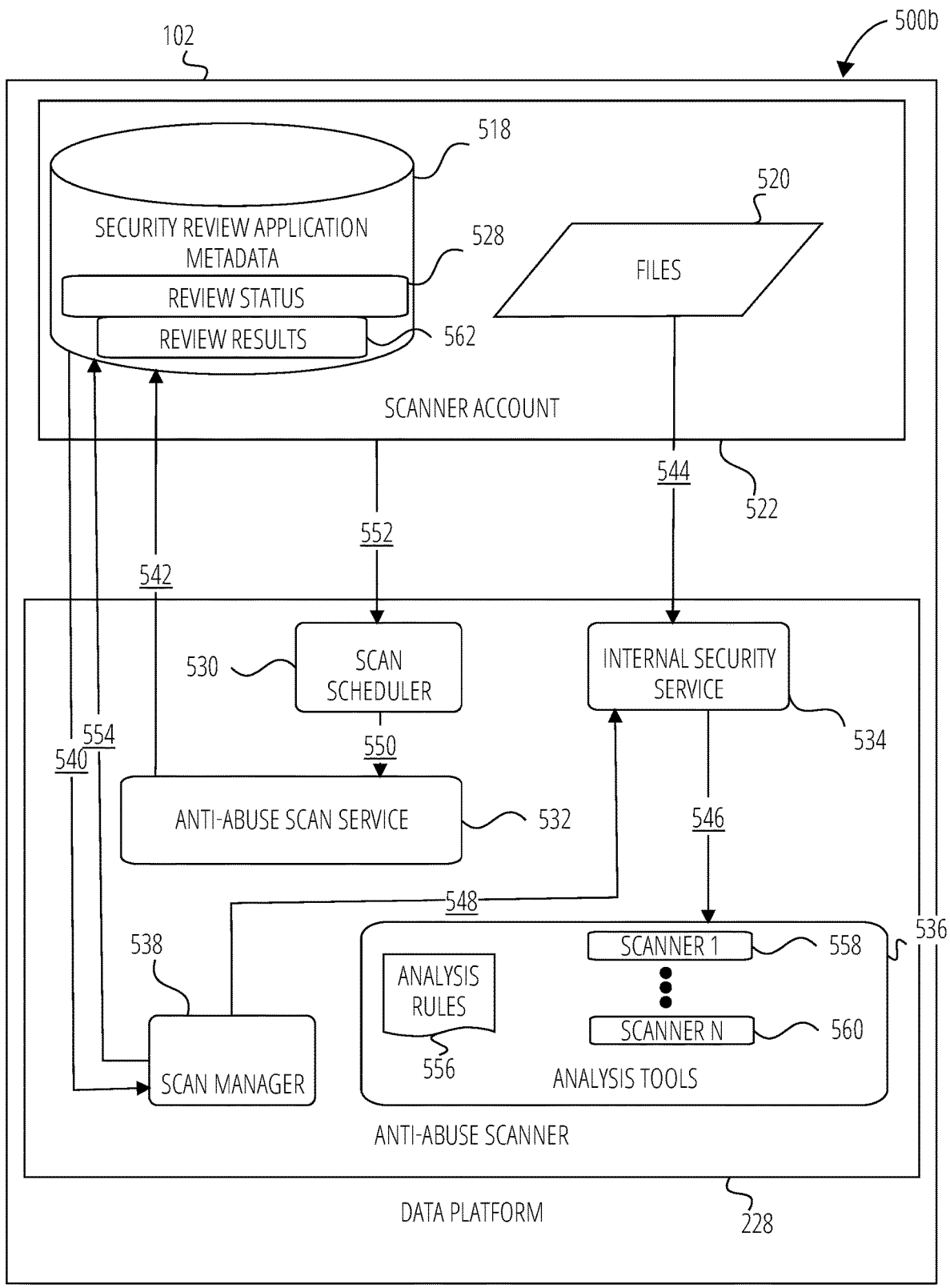
FIG. 5B is a collaboration diagram of an anti-abuse scanning pipeline, in accordance with some examples.
Figure 5C:
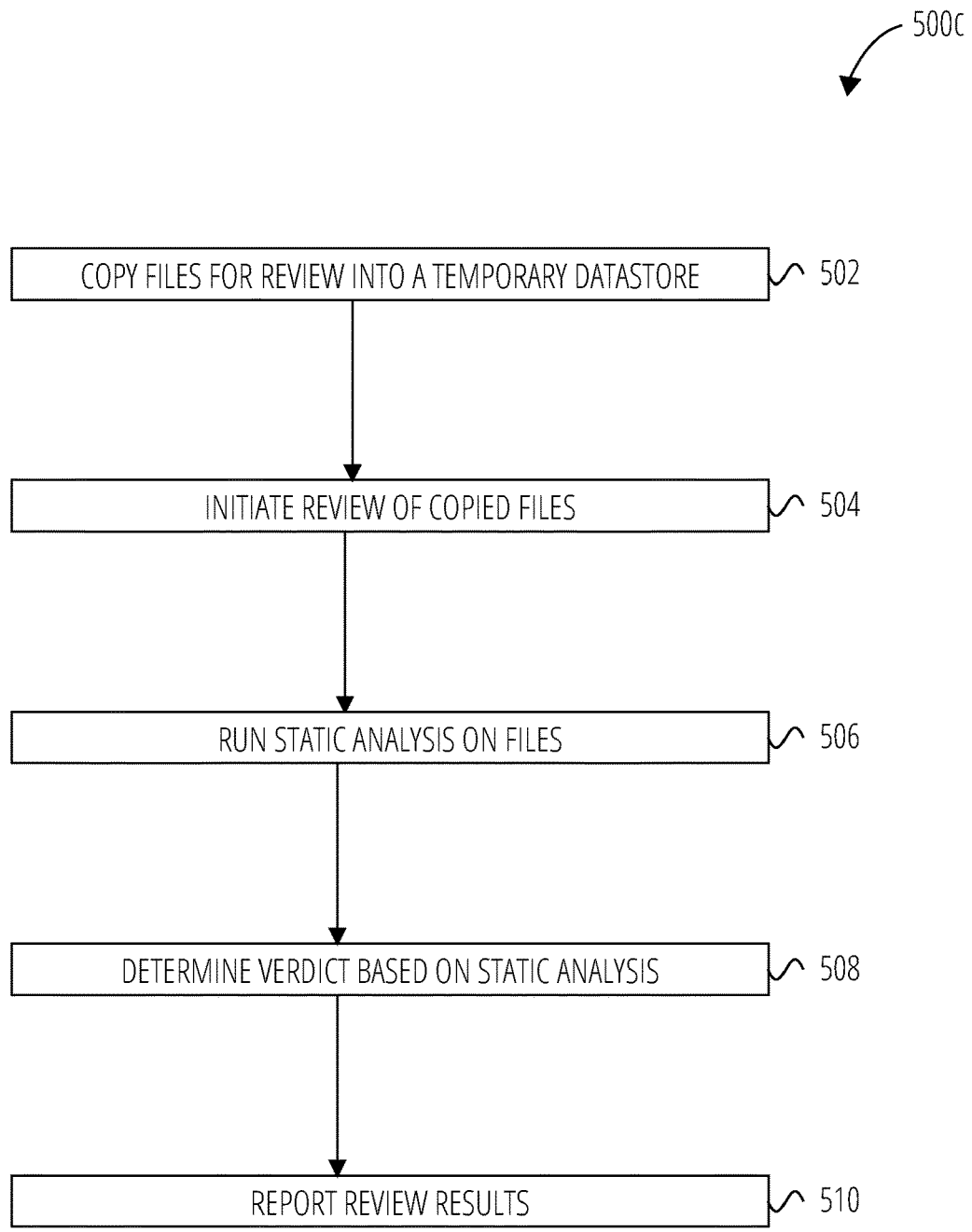
FIG. 5C is an activity diagram of an anti-abuse scanning method, in accordance with some examples.

In operation 406, the data platform 102 pushes all versions and patches of the application package 420 for automated review by a scanning workflow as more fully described in reference to FIG. 5A, FIG. 5B, and FIG. 5C.

In operation 408, the data platform 102 determines if the application package 420 has been approved. For example, the data platform 102 determines that scanning of the application package 420 and its versions and patches is complete and the data platform 102 writes a verdict and status to the application version metadata 456 for each version and patch of the application package 420. A listing is published or released if the functional and profile review has been performed, and only approved versions remain in the application package 420.

In operation 410, in response to determining that the application package 420 is approved 460, in operation 410, the data platform 102 releases the application package 420 for deployment by the provider 416 so that a consumer 434 can deploy the application 436 in their own consumer account 418 and uses the application 436 to access the shared content 426 provided by the provider 416.

In some examples, in a case the data platform 102 does not approve 458 the application package 420, the provider removes any unapproved versions or patches from the application package 420 by adding new approved versions or updates of the application package 420, updates release directives, waits for an upgrade to occur, and removes the non-approved versions or patches. In operation 412, the data platform 102 detects the updated application package 420 and, in operation 406, reviews the application package 420.

In some examples, the data platform 102 continuously polls for updates to the application package 420. When a provider subsequently creates new versions in the application package 420, in operation 412 the data platform 102 detects that the update has occurred. In response to detecting that an update to the application package 420 has occurred, in operation 406, the data platform 102 triggers an automated review of the application package 420 as described herein. In some examples, an automated review is triggered for the versions being added, with those versions being set in a pending state (as opposed to an added state). If the automated review is successful and the new versions or updates to the application package 420 are approved, the versions are added and available in the package to be referenced by directives, otherwise they are marked as deleted in the application version metadata 456.

FIG. 5A is a data flow diagram of an anti-abuse scanning method, FIG. 5B is a collaboration diagram of an anti-abuse scanning pipeline 500b, and FIG. 5C is an activity diagram of an anti-abuse scanning method 500c, in accordance with some examples. A data platform 102 uses the anti-abuse scanning pipeline 500b to scan files of an application package 420 for content that may be harmful or malicious before that content is released on a data platform 102 to consumers of the content of the application package 420.

In operation 502, the data platform 102 copies the files 454 of the application package 420 to a set of temporary files 520 in a named storage location 516 of a scanner account 522. For example, the data platform 102 creates a temporary inbound datastore 514 in the scanner account 522 of a scanner deployment 512 and a corresponding temporary outbound datastore 526 in the provider account 414 of a provider deployment 524. In some examples, the data platform 102 uses these temporary datastores to decrypt and encrypt large files during a copy process. In some examples, the data platform 102 copies the files 454 of the application package 420 into the temporary outbound datastore 526 using a copy service. In some examples, the data platform 102 sets a property in the security review application metadata 518 to a pending copy state.

In some examples, the data platform 102 sends a review request with details of the application package review and the location of application files 454 to the scanner deployment 512 by looking up the review object using the copy service client id of a copy service. In some examples, a global messaging system is used so as to avoid the provider account 414 resolving to the named datastore of the scanner account 522. In some examples, the global message framework runs in privileged mode thus double copy is worth keeping the logic unified. In some examples, the data platform 102 updates the security review application metadata 518 and sets a status property to a "new" state. In some examples, the data platform 102 sets a status property in the security review application metadata 518 to a pending scan state.

In some examples, the anti-abuse scanner 228 issues a system command to list reviews by status state, such as the pending scan state.

In operation 504, a scan scheduler 530 of anti-abuse scanner 228 scans the security review application metadata 518 for a review status property 528 in a state of a pending scan review and initiates a scan of the files 520 based on the state of the review status property 528. For example, the anti-abuse scanner 228 is associated with the application package 420 account in a corresponding deployment and is authorized to fetch pending reviews from the review status property 528 of the security review application metadata 518 and write review results 562 to the security review application metadata 518. To do so, the anti-abuse scanner 228 periodically polls for new application packages, such as application package 420, available for review. In some examples, the scan scheduler 530 schedules re-scans of existing application packages. In some examples, the scan scheduler 530 periodically polls for new scans to run. In some examples, the scan scheduler 530 periodically fetches 552 from the scanner account 522 pending review requests. In some examples, the scan scheduler 530 also fetches 552 previous successful and unsuccessful scans that haven't been run in a specified amount of elapsed time.

In operation 506, if there are application packages, such as application package 420, available for review, then the anti-abuse scanner 228 runs a static analysis on the files. For example, the scan scheduler 530 calls 550 an anti-abuse scan service 532 for each application package to scan. The anti-abuse scan service 532 determines the scans to run for the application package, and writes 542 a status set to pending for each application package being scanned to the review status property 528 datastore.

A scan manager 538 runs in a background process of the data platform 102 and polls 540 for pending application package scans, and detects the new scans to run. In response to detecting a new scan, the scan manager 538 calls 548 internal security service 534 to run the scans for a given application package. In some examples, the scan manager 538 retries previously failed scans for a specified number of retries.

The internal security service 534 downloads 544 the artifacts or files 520 of the application package 420 stored in the scanner account 522.

The internal security service 534 invokes 546 local analysis tools 536 to scan the downloaded files 520.

In operation 508, when the analysis tools 536 complete their analysis of the files 520, the scan manager 538 determines a verdict of whether the files 520 contain content that is harmful or malicious and updates 554 the results to the security review application metadata 518 in the scanner account 522, and triggers a deployment decision in a form of an automatic approval, an automatic rejection, or a manual review of the application package 420. In some examples, the anti-abuse scanner 228 compares current review results of a scan of an application package to previous review results from a previous review of the application package and triggers an automatic approval, an automatic rejection, or a manual review based on the comparison. For example, if the application package 420 review results have changed as compared to a previous scan to an extent that the package is now automatically rejected, the anti-abuse scanner 228 determines to submit the application package for manual review rather than issuing an automatic rejection.

In some examples, the analysis tools 536 comprise a set of scanner tools, as illustrated by scanner 1 558 to scanner N 560, that implement respective static analysis scanning methodologies for detecting content that is harmful or malicious. The scanner tools include, but are not limited to, Semgrep, SpotBugs/FindSecBugs, Open Web Application Security Project® (OWASP) Dependency Check, ClamAV, and Yara. Indicators of malicious functionality in the source code are caught using a set of analysis rules 556.

In some examples, based on the programming languages employed by the provider to create the files 520 and the analysis rules 556, the anti-abuse scanner 228 determines a subset of scanner tools of the set of scanner tools to generate a verdict regarding an artifact or file. Each scanner tool of the subset of scanner tools generates a respective verdict of a set of verdicts where each verdict is a verdict by a scanner tool of whether the files 520 contain content that is harmful or malicious. In some examples, each scanner tool generates a verdict that includes a confidence score. In some examples, a scanner tool outputs a scanner-specific output with additional details about what the scanner tool detected in the files 520. The anti-abuse scanner 228 determines a set of verdicts based on the set of scanners and aggregates the set of verdicts to determine a deployment decision of whether to approve the application package for deployment on the data platform 102, reject the application package for deployment on the data platform 102, or require a manual review of the application package before the application package can be deployed on the data platform 102.

In some examples, the anti-abuse scanner 228 determines a risk score for an application package based on the set of verdicts and compares the risk score to a set of threshold risk score values. The anti-abuse scanner 228 automatically approves an application package based on the risk score of the application package failing to exceed a minimum (first) specified threshold risk score value. The anti-abuse scanner 228 automatically rejects an application package based on the risk score of the application package exceeding a maximum (second) specified threshold risk score value. The anti-abuse scanner 228 triggers a manual review, requiring a human reviewer to take a look at the scanner output to then approve or reject an application package, based on the risk score of the application package exceeding the minimum (first) specified threshold risk score value and failing to exceed the maximum (second) specified threshold risk score value.

In some examples, the anti-abuse scanner 228 determines a confidence score for a rejection verdict, where the confidence score falls within a range of confidence scores such as, but not limited to, from 0-10, with 10 being the most confident. Additionally, the anti-abuse scanner 228 analyzes any verdicts from previous scans that have been manually approved or rejected. The anti-abuse scanner 228 determines a deployment decision based on a set of threshold confidence value scores and verdicts from previous scans of the application package. For example, if all verdicts either have a confidence less than a first threshold confidence score value (e.g., 3), or have been manually approved and haven't changed since the manual approval, the anti-abuse scanner 228 determines to automatically approve the application package 420 for deployment on the data platform 102. If any rejection verdict has a confidence score exceeding a second confidence score value (e.g., 7) and has not been manually approved, or if any rejection verdict has previously been manually rejected and has not changed since manual rejection, then the anti-abuse scanner 228 determines to automatically reject the application package for deployment on the data platform 102. In all other cases, the anti-abuse scanner 228 triggers a manual review.

In some examples, the anti-abuse scanner 228 updates 554 a review status property 528 state, and review results 562 including examples of scan results to the security review application metadata 518 and stored in tables in the security review application metadata 518. In some examples, a table stores an overall status of the entire application package scan and deployment decision (approved, rejected, manual review), while another table stores detailed output logs for each scan run over the artifacts or files of the application package.

In some examples, the anti-abuse scanner 228 triggers a manual review by communicating an alert to scanner account 522. A service of the scanner account 522 periodically checks for a review status property 528 having a state of manual review required and communicates an email to a security engineer of the data platform 102 to perform a manual review in order to make a deployment decision. When the manual review is triggered, the reviewer will review the review status property 528 and the review results 562 and manually approve or reject the application package. If the reviewer decides to approve the application package, an approval procedure executes a system command to approve the security review for the application package, and update each flagged verdict in the review status property 528 as manually approved. If the reviewer instead decides to reject the application, a rejection procedure executes a system command to reject the security review for the application package, and take a list of verdicts that represent the reason for rejection to mark each of them as manually rejected in the review status property 528.

In some examples, in subsequent background scans or scans of future versions of an application package that was not approved, the anti-abuse scanner 228 will take manual approvals and manual rejections into account to avoid re-triggering manual review for an identical verdict.

In some examples, if the scanner output logs of the review results 562 do not have enough detail for a reviewer to make a decision, they reviewer may need to inspect the application code. To support this scenario, the data platform 102 will host a secure datastore serving as a container with permissions to download and view files of the application package, along with an Integrated Development Environment (IDE) to visualize them. In some examples, access to this container is limited to security engineers on the security team, and both logins to the container and file downloads are audited. In some examples, files of an application package under review will not leave the secure datastore.

In some examples, the anti-abuse scanner 228 performs periodic scans including, but not limited to, handling new review requests, periodic re-scans, and retrying failures. The periodic scans are based on a variety of criteria including, but not limited to, reviewing requests for new applications, re-running scans that have permanently failed by exceeding a maximum number of retries, and re-scanning versions of application packages of active versions that have succeeded.

In some examples, re-scans are performed on active versions of an application package to catch new vulnerabilities in case the operator 462 of the data platform 102 retroactively adds new analysis rules 556.

In some examples, on a re-scan of an active application package, a status change to an already-published version (e.g., a newly-triggered manual review, or a new automatic rejection) triggers trigger a manual review, and the action taken will happen manually on a case-by-case basis.

In operation 510, the scan manager 538 updates 554 the review results 562 of the security review application metadata 518 with a generated verdict. The anti-abuse scanner 228 communicates the verdict to the provider deployment 524 with a global message to update the corresponding application version metadata 456. The anti-abuse scanner 228 also writes this verdict as review status property 528 in the security review application metadata 518 in the scanner account 522 along with any other logs and metrics related to the scan as review results 562.

Figure 6:
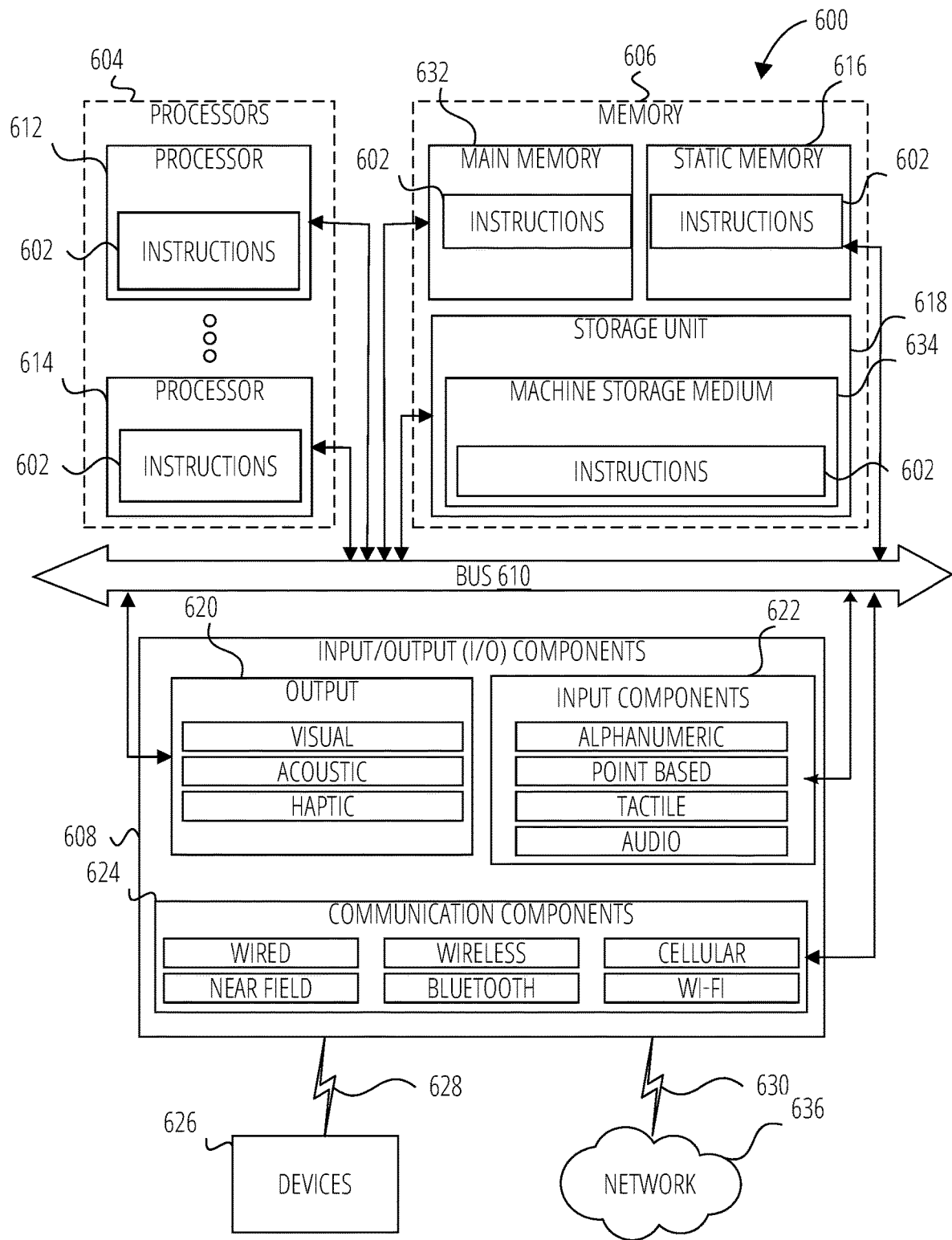
FIG. 6 illustrates a diagrammatic representation of a machine in the form of a computer system within which a set of instructions may be executed for causing the machine to perform any one or more of the methodologies discussed herein, in accordance with some examples.

FIG. 6 illustrates a diagrammatic representation of a machine 600 in the form of a computer system within which a set of instructions may be executed for causing the machine 600 to perform any one or more of the methodologies discussed herein, according to examples. Specifically, FIG. 6 shows a diagrammatic representation of the machine 600 in the example form of a computer system, within which instructions 602 (e.g., software, a program, an application, an applet, a data application, or other executable code) for causing the machine 600 to perform any one or more of the methodologies discussed herein may be executed. For example, the instructions 602 may cause the machine 600 to execute any one or more operations of any one or more of the methods described herein. In this way, the instructions 602 transform a general, non-programmed machine into a particular machine 600 (e.g., the compute service manager 104, the execution platform 110, and the data storage devices 1 to N of data storage 106) that is specially configured to carry out any one of the described and illustrated functions in the manner described herein.

In alternative examples, the machine 600 operates as a standalone device or may be coupled (e.g., networked) to other machines. In a networked deployment, the machine 600 may operate in the capacity of a server machine or a client machine in a server-client network environment, or as a peer machine in a peer-to-peer (or distributed) network environment. The machine 600 may comprise, but not be limited to, a server computer, a client computer, a personal computer (PC), a tablet computer, a laptop computer, a netbook, a smart phone, a mobile device, a network router, a network switch, a network bridge, or any machine capable of executing the instructions 602, sequentially or otherwise, that specify actions to be taken by the machine 600. Further, while only a single machine 600 is illustrated, the term "machine" shall also be taken to include a collection of machines that individually or jointly execute the instructions 602 to perform any one or more of the methodologies discussed herein.

The machine 600 includes processors 604, memory 606, and I/O components 608 configured to communicate with each other such as via a bus 610. In some examples, the processors 604 (e.g., a central processing unit (CPU), a reduced instruction set computing (RISC) processor, a complex instruction set computing (CISC) processor, a graphics processing unit (GPU), a digital signal processor (DSP), an application-specific integrated circuit (ASIC), a radio-frequency integrated circuit (RFIC), another processor, or any suitable combination thereof) may include, for example, multiple processors as exemplified by processor 612 and a processor 614 that may execute the instructions 602. The term "processor" is intended to include multi-core processors that may comprise two or more independent processors (sometimes referred to as "cores") that may execute instructions 602 contemporaneously. Although FIG. 6 shows multiple processors 604, the machine 600 may include a single processor with a single core, a single processor with multiple cores (e.g., a multi-core processor), multiple processors with a single core, multiple processors with multiple cores, or any combination thereof.

The memory 606 may include a main memory 632, a static memory 616, and a storage unit 618 including a machine storage medium 634, all accessible to the processors 604 such as via the bus 610. The main memory 632, the static memory 616, and the storage unit 618 store the instructions 602 embodying any one or more of the methodologies or functions described herein. The instructions 602 may also reside, completely or partially, within the main memory 632, within the static memory 616, within the storage unit 618, within at least one of the processors 604 (e.g., within the processor's cache memory), or any suitable combination thereof, during execution thereof by the machine 600.

The input/output (I/O) components 608 include components to receive input, provide output, produce output, transmit information, exchange information, capture measurements, and so on. The specific I/O components 608 that are included in a particular machine 600 will depend on the type of machine. For example, portable machines such as mobile phones will likely include a touch input device or other such input mechanisms, while a headless server machine will likely not include such a touch input device. It will be appreciated that the I/O components 608 may include many other components that are not shown in FIG. 6. The I/O components 608 are grouped according to functionality merely for simplifying the following discussion and the grouping is in no way limiting. In various examples, the I/O components 608 may include output components 620 and input components 622. The output components 620 may include visual components (e.g., a display such as a plasma display panel (PDP), a light emitting diode (LED) display, a liquid crystal display (LCD), a projector, or a cathode ray tube (CRT)), acoustic components (e.g., speakers), other signal generators, and so forth. The input components 622 may include alphanumeric input components (e.g., a keyboard, a touch screen configured to receive alphanumeric input, a photo-optical keyboard, or other alphanumeric input components), point-based input components (e.g., a mouse, a touchpad, a trackball, a joystick, a motion sensor, or another pointing instrument), tactile input components (e.g., a physical button, a touch screen that provides location and/or force of touches or touch gestures, or other tactile input components), audio input components (e.g., a microphone), and the like.

Communication may be implemented using a wide variety of technologies. The I/O components 608 may include communication components 624 operable to couple the machine 600 to a network 636 or devices 626 via a coupling 630 and a coupling 628, respectively. For example, the communication components 624 may include a network interface component or another suitable device to interface with the network 636. In further examples, the communication components 624 may include wired communication components, wireless communication components, cellular communication components, and other communication components to provide communication via other modalities. The devices 626 may be another machine or any of a wide variety of peripheral devices (e.g., a peripheral device coupled via a universal serial bus (USB)). For example, as noted above, the machine 600 may correspond to any one of the compute service manager 104, the execution platform 110, and the devices 626 may include the data storage device 226 or any other computing device described herein as being in communication with the data platform 102 or the data storage 106.

The various memories (e.g., 606, 616, 632, and/or memory of the processor(s) 604 and/or the storage unit 618) may store one or more sets of instructions 602 and data structures (e.g., software) embodying or utilized by any one or more of the methodologies or functions described herein. These instructions 602, when executed by the processor(s) 604, cause various operations to implement the disclosed examples.

As used herein, the terms "machine-storage medium," "device-storage medium," and "computer-storage medium" mean the same thing and may be used interchangeably in this disclosure. The terms refer to a single or multiple storage devices and/or media (e.g., a centralized or distributed database, and/or associated caches and servers) that store executable instructions and/or data. The terms shall accordingly be taken to include, but not be limited to, solid-state memories, and optical and magnetic media, including memory internal or external to processors. Specific examples of machine-storage media, computer-storage media, and/or device-storage media include non-volatile memory, including by way of example semiconductor memory devices, e.g., erasable programmable read-only memory (EPROM), electrically erasable programmable read-only memory (EEPROM), field-programmable gate arrays (FPGAs), and flash memory devices; magnetic disks such as internal hard disks and removable disks; magneto-optical disks; and CD-ROM and DVD-ROM disks. The terms "machine-storage media," "computer-storage media," and "device-storage media" specifically exclude carrier waves, modulated data signals, and other such media, at least some of which are covered under the term "signal medium" discussed below.

In various examples, one or more portions of the network 636 may be an ad hoc network, an intranet, an extranet, a virtual private network (VPN), a local-area network (LAN), a wireless LAN (WLAN), a wide-area network (WAN), a wireless WAN (WWAN), a metropolitan-area network (MAN), the Internet, a portion of the Internet, a portion of the public switched telephone network (PSTN), a plain old telephone service (POTS) network, a cellular telephone network, a wireless network, a Wi-Fi® network, another type of network, or a combination of two or more such networks. For example, the network 636 or a portion of the network 636 may include a wireless or cellular network, and the coupling 630 may be a Code Division Multiple Access (CDMA) connection, a Global System for Mobile communications (GSM) connection, or another type of cellular or wireless coupling. In this example, the coupling 630 may implement any of a variety of types of data transfer technology, such as Single Carrier Radio Transmission Technology (1×RTT), Evolution-Data Optimized (EVDO) technology, General Packet Radio Service (GPRS) technology, Enhanced Data rates for GSM Evolution (EDGE) technology, third Generation Partnership Project (3GPP) including 3G, fourth generation wireless (4G) networks, fifth generation wireless (5G) networks, Universal Mobile Telecommunications System (UMTS), High-Speed Packet Access (HSPA), Worldwide Interoperability for Microwave Access (WiMAX), Long Term Evolution (LTE) standard, others defined by various standard-setting organizations, other long-range protocols, or other data transfer technology.

The instructions 602 may be transmitted or received over the network 636 using a transmission medium via a network interface device (e.g., a network interface component included in the communication components 624) and utilizing any one of a number of well-known transfer protocols (e.g., hypertext transfer protocol (HTTP)). Similarly, the instructions 602 may be transmitted or received using a transmission medium via the coupling 628 (e.g., a peer-to-peer coupling) to the devices 626. The terms "transmission medium" and "signal medium" mean the same thing and may be used interchangeably in this disclosure. The terms "transmission medium" and "signal medium" shall be taken to include any intangible medium that is capable of storing, encoding, or carrying the instructions 602 for execution by the machine 600, and include digital or analog communications signals or other intangible media to facilitate communication of such software. Hence, the terms "transmission medium" and "signal medium" shall be taken to include any form of modulated data signal, carrier wave, and so forth. The term "modulated data signal" means a signal that has one or more of its characteristics set or changed in such a manner as to encode information in the signal.

The various operations of example methods described herein may be performed, at least partially, by one or more processors that are temporarily configured (e.g., by software) or permanently configured to perform the relevant operations. Similarly, the methods described herein may be at least partially processor-implemented. For example, at least some of the operations of the methodologies disclosed herein may be performed by one or more processors. The performance of certain of the operations may be distributed among the one or more processors, not only residing within a single machine, but also deployed across a number of machines. In some examples, the processor or processors may be located in a single location (e.g., within a home environment, an office environment, or a server farm), while in other examples the processors may be distributed across a number of locations.

Although the examples of the present disclosure have been described with reference to specific examples, it will be evident that various modifications and changes may be made to these examples without departing from the broader scope of the inventive subject matter. Accordingly, the specification and drawings are to be regarded in an illustrative rather than a restrictive sense. The accompanying drawings that form a part hereof show, by way of illustration, and not of limitation, specific examples in which the subject matter may be practiced. The examples illustrated are described in sufficient detail to enable those skilled in the art to practice the teachings disclosed herein. Other examples may be used and derived therefrom, such that structural and logical substitutions and changes may be made without departing from the scope of this disclosure. This Detailed Description, therefore, is not to be taken in a limiting sense, and the scope of various examples is defined only by the appended claims, along with the full range of equivalents to which such claims are entitled.

In this document, the terms "a" or "an" are used, as is common in patent documents, to include one or more than one, independent of any other instances or usages of "at least one" or "one or more." In this document, the term "or" is used to refer to a nonexclusive or, such that "A or B" includes "A but not B," "B but not A," and "A and B," unless otherwise indicated. In the appended claims, the terms "including" and "in which" are used as the plain-English equivalents of the respective terms "comprising" and "wherein." Also, in the following claims, the terms "including" and "comprising" are open-ended; that is, a system, device, article, or process that includes elements in addition to those listed after such a term in a claim is still deemed to fall within the scope of that claim.

Such examples of the inventive subject matter may be referred to herein, individually and/or collectively, by the term "example" merely for convenience and without intending to voluntarily limit the scope of this application to any single invention or inventive concept if more than one is in fact disclosed. Thus, although specific examples have been illustrated and described herein, it should be appreciated that any arrangement calculated to achieve the same purpose may be substituted for the specific examples shown. This disclosure is intended to cover any and all adaptations or variations of various examples. Combinations of the above examples, and other examples not specifically described herein, will be apparent to those of skill in the art, upon reviewing the above description.

What is claimed is:

1. A computer-implemented method comprising:
   detecting, by one or more processors, a creation of an application package on a data platform by a provider of content to the data platform, the application package comprising a set of files for deployment on the data platform for use by a consumer of data services on the data platform;
   adding, by the one or more processors, metadata to the application package, the metadata comprising a scan property status for each version and patch of the application package;
   performing, by the one or more processors, a review of the set of files based on the scan property status of the metadata, the review to detect malicious content based on a set of analysis rules; and
   generating, by the one or more processors, a deployment decision for the application package for deployment on the data platform based on a result of the review.

2. The computer-implemented method of claim 1, wherein detecting the creation of the application package comprises detecting a creation of a listing of the application package, the listing targeting a consumer of data services on the data platform.

3. The computer-implemented method of claim 2, wherein the listing is a public listing.

4. The computer-implemented method of claim 2, wherein the listing is a private listing.

5. The computer-implemented method of claim 1, wherein the review comprises:
   scanning the set of files using a set of scanner tools, the set of scanner tools generating a respective verdict of a set of verdicts of whether the set of files contain malicious content.

6. The computer-implemented method of claim 5, further comprising:
   generating a risk score based on the set of verdicts; and
   determining the result of the review based on the risk score.

7. The computer-implemented method of claim 6, wherein the result of the review is determined further based on a previous result of a previous review.

8. The computer-implemented method of claim 6, wherein the result of the review comprises an automatic rejection of the deployment of the application package.

9. The computer-implemented method of claim 6, wherein the result of the review comprises an automatic approval of the deployment of the application package.

10. The computer-implemented method of claim 6, wherein the result of the review comprises triggering a manual review of the deployment of the application package.

11. A data platform comprising:
    at least one processor; and
    at least one memory storing instructions that cause the at least one processor to perform operations comprising:
    detecting a creation of an application package on a data platform by a provider of content to the data platform, the application package comprising a set of files for deployment on the data platform for use by a consumer of data services on the data platform;
    adding metadata to the application package, the metadata comprising a scan property status for each version and patch of the application package;
    performing a review of the set of files based on the scan property status of the metadata, the review to detect malicious content based on a set of analysis rules; and
    generating a deployment decision for the application package for deployment on the data platform based on a result of the review.

12. The data platform of claim 11, wherein detecting the creation of the application package comprises detecting a creation of a listing of the application package, the listing targeting a consumer of data services on the data platform.

13. The data platform of claim 12, wherein the listing is a public listing.

14. The data platform of claim 12, wherein the listing is a private listing.

15. The data platform of claim 11, wherein the review comprises:
    scanning the set of files using a set of scanner tools, the set of scanner tools generating a respective verdict of a set of verdicts of whether the set of files contain malicious content.

16. The data platform of claim 15, wherein the operations further comprise:
    generating a risk score based on the set of verdicts; and
    determining the result of the review based on the risk score.

17. The data platform of claim 16, wherein the result of the review is determined further based on a previous result of a previous review.

18. The data platform of claim 16, wherein the result of the review comprises an automatic rejection of the deployment of the application package.

19. The data platform of claim 16, wherein the result of the review comprises an automatic approval of the deployment of the application package.

20. The data platform of claim 16, wherein the result of the review comprises triggering a manual review of the deployment of the application package.

21. A computer-storage medium comprising instructions that, when executed by one or more processors of a machine, configure the machine to perform operations comprising:
    detecting a creation of an application package on a data platform by a provider of content to the data platform, the application package comprising a set of files for deployment on the data platform for use by a consumer of data services on the data platform;
    adding metadata to the application package, the metadata comprising a scan property status for each version and patch of the application package;
    performing a review of the set of files based on the scan property status of the metadata, the review to detect malicious content based on a set of analysis rules; and
    generating a deployment decision for the application package for deployment on the data platform based on a result of the review.

22. The computer-storage medium of claim 21, wherein detecting the creation of the application package comprises detecting a creation of a listing of the application package, the listing targeting a consumer of data services on the data platform.

23. The computer-storage medium of claim 22, wherein the listing is a public listing.

24. The computer-storage medium of claim 22, wherein the listing is a private listing.

25. The computer-storage medium of claim 21, wherein the review comprises:
> scanning the set of files using a set of scanner tools, the set of scanner tools generating a respective verdict of a set of verdicts of whether the set of files contain malicious content.

26. The computer-storage medium of claim 25, wherein the operations further comprise:
> generating a risk score based on the set of verdicts; and
> determining the result of the review based on the risk score.

27. The computer-storage medium of claim 26, wherein the result of the review is determined further based on a previous result of a previous review.

28. The computer-storage medium of claim 26, wherein the result of the review comprises an automatic rejection of the deployment of the application package.

29. The computer-storage medium of claim 26, wherein the result of the review comprises an automatic approval of deployment of the application package.

30. The computer-storage medium of claim 26, wherein the result of the review comprises triggering a manual review of the deployment of the application package.

\* \* \* \* \*